US012307512B2

(12) United States Patent
Cai et al.

(10) Patent No.: US 12,307,512 B2
(45) Date of Patent: May 20, 2025

(54) SYSTEMS AND METHODS FOR EXECUTING MODELS BASED ON METADATA

(71) Applicant: Bank of Montreal, Toronto (CA)

(72) Inventors: Yangming Chris Cai, Toronto (CA); Sriram Rajaram, Toronto (CA)

(73) Assignee: Bank of Montreal, Toronto (CA)

( * ) Notice: Subject to any disclaimer, the term of this patent is extended or adjusted under 35 U.S.C. 154(b) by 274 days.

(21) Appl. No.: 17/890,903

(22) Filed: Aug. 18, 2022

(65) Prior Publication Data

US 2023/0186384 A1 Jun. 15, 2023

Related U.S. Application Data

(60) Provisional application No. 63/237,901, filed on Aug. 27, 2021.

(51) Int. Cl.
*G06Q 40/03* (2023.01)
(52) U.S. Cl.
CPC .................... *G06Q 40/03* (2023.01)
(58) Field of Classification Search
CPC ...................................... G06Q 40/03
See application file for complete search history.

(56) References Cited

U.S. PATENT DOCUMENTS

2020/0081841 A1\* 3/2020 Samynathan ....... G06F 12/0859
2020/0379806 A1\* 12/2020 Mann ................. G06F 9/5083

\* cited by examiner

*Primary Examiner* — Bennett M Sigmond
*Assistant Examiner* — Marla Hudson
(74) *Attorney, Agent, or Firm* — Foley & Lardner LLP (57) ABSTRACT

A system may include one or more processors configured to receive a set of data containing relational database metadata, model data, and customer loan data, configure a first model and a second model based on the model data and the metadata, and partition, based on the relational database metadata, the customer loan data into first data and second data. The one or more processors may execute, by executing a first execution unit, execute the first model using the first data to output a first credit risk score, execute, by executing a second execution unit different from the first execution unit, the second model using the second data to output a second credit risk score, generate a third credit risk score based on the first credit risk score and the second credit risk score, and transmit a notification based on the third credit risk score.

18 Claims, 6 Drawing Sheets

|   | C1 421 month | C2 422 interest rate | C3 423 start balance | C4 424 scheduled payment | C5 425 interest paid | C6 426 amortized amount | C7 427 end balance |
|---|---|---|---|---|---|---|---|
| R1 411 | 1 | 0.1189% | 1,832,066.78 | 7,165.08 | 2,178.20 | 4,986.89 | 1,827,079.89 |
| R2 412 | 2 | 0.1213% | 1,827,079.89 | 7,190.00 | 2,216.60 | 4,973.41 | 1,822,106.48 |
| R3 413 | 3 | 0.1216% | 1,822,106.48 | 7,193.15 | 2,216.15 | 4,977.00 | 1,817,129.48 |
| R4 414 | 4 | 0.1217% | 1,817,129.48 | 7,193.91 | 2,211.45 | 4,982.46 | 1,812,147.02 |
| R5 415 | 5 | 0.1222% | =C7(R4) | =C2*(C3+(C3/((1+C3)^(305-C1+1)-1))) | =C3*C2 | =C4-C5 | =C3-C6 |
|   |   |   | 443 | 444 | 445 | 446 | 447 |

SYSTEMS AND METHODS FOR EXECUTING MODELS BASED ON METADATA

CROSS-REFERENCE TO RELATED APPLICATION

This application claims priority to U.S. Provisional Patent Application No. 63/237,901, filed Aug. 27, 2021, which is incorporated by reference in its entirety for all purposes.

TECHNICAL FIELD

This application is generally directed towards a data processing system, and more specifically towards systems and methods for executing models based on metadata.

BACKGROUND

A statistical analysis system (e.g., statistical analysis software) can retrieve data from a variety of sources (e.g., a relational database) and perform statistical analysis. Relational databases store data in structured manner, organized in tables and columns with constraints on the data, such as primary and unique keys. Relational database metadata may include information relating to these structures and constraints.

SUMMARY

Disclosed herein are systems and methods capable of addressing the above-described shortcomings and may also provide any number of additional or alternative benefits and advantages. Embodiments described herein provide for systems and methods that execute models based on metadata. A statistical analysis system can implement specific models to be applied to existing credit data. The embodiments herein aim to reduce the development time for implementing specific models.

In an embodiment, a method may include receiving, by one or more processors, a set of data containing relational database metadata, model data, and customer loan data. The method may include configuring, by the one or more processors, a first model and a second model based on the model data and the metadata. The method may include partitioning, by the one or more processors based on the relational database metadata, the customer loan data into first data and second data. The method may include executing, by the one or more processors executing a first execution unit, the first model using the first data of the customer loan data to output a first credit risk score. The method may include executing, by the one or more processors executing a second execution unit different from the first execution unit, the second model using the second data of the customer loan data to output a second credit risk score. The method may include generating, by the one or more processors, a third credit risk score based on the first credit risk score and the second credit risk score. The method may include transmitting, by the one or more processors, a notification based on the third credit risk score.

In another embodiment, a system may include one or more processors. The one or more processors may be configured to receive a set of data containing relational database metadata, model data, and customer loan data. The one or more processors may be configured to configure a first model and a second model based on the model data and the metadata. The one or more processors may be configured to partition, based on the relational database metadata, the customer loan data into first data and second data. The one or more processors may be configured to execute, by executing a first execution unit, the first model using the first data of the customer loan data to output a first credit risk score. The one or more processors may be configured to execute, by executing a second execution unit different from the first execution unit, the second model using the second data of the customer loan data to output a second credit risk score. The one or more processors may be configured to generate a third credit risk score based on the first credit risk score and the second credit risk score. The one or more processors may be configured to transmit a notification based on the third credit risk score.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

DETAILED DESCRIPTION

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein generally relate to systems and methods that execute models based on metadata. Embodiments disclosed herein describe a system including one or more processors may be configured to receive a set of data containing relational database metadata, model data, and customer loan data. The one or more processors may be configured to configure a first model and a second model based on the model data and the metadata. The one or more processors may be configured to partition, based on the relational database metadata, the customer loan data into first data and second data. The one or more processors may be configured to execute, by executing a first execution unit, the first model using the first data of the customer loan data to output a first credit risk score. The one or more processors may be configured to execute, by executing a second execution unit different from the first execution unit, the second model using the second data of the customer loan data to output a second credit risk score. The one or more processors may be configured to generate a third credit risk score based on the first credit risk score and the second credit risk score. The one or more processors may be configured to transmit a notification based on the third credit risk score.

One problem relates to implementing specific models to be applied to existing credit data for a credit risk modelling and/or analysis. There is a need for reduce the development time for implementing specific models.

Moreover, credit risk modelling/analysis are often performed with large credit data based on a number of credit risk metrics in multiple scenarios. For example, credit data may include scenario data and/or risk portfolio data. Credit risk metrics may include metrics for (1) stress testing (macro-stress testing (MST), comprehensive capital analysis and review (CCAR)), (2) regulatory capital (e.g., risk-weighted assets (RWA)), (3) expected credit losses (ECL) allowance, (4) advanced internal rating-based (AIRB), (5) International Financial Reporting Standard (e.g., IFRS 9), (6) probability of default (PD) Models, and (7) loss given default (LGD) models. Test results with particular statistical analysis software showed that there is a need for efficiently performing credit risk modelling/analysis with large credit data based on these multiple credit risk metrics in multiple scenarios. For example, when the statistical analysis software monthly processed more than 11 million records of risk portfolio data (e.g., data relating to loans, credit cards, lines of credits, etc.) and data relating to more than $930 billion in exposure at default (EAD), its run time was 22 to 24 hours. When the statistical analysis software performed a stress testing with 15 PD models, 14 LGD models, and one scenario and 12 quarters of forecast, its run time with 120 GB data was more than 13 hours. When the statistical analysis software performed an IFRS 9 processing with 18 PD models, 6 LGD models, 3 scenarios and 15 years of forecast, its run time with 1.5 TB data was between 11-13 hours. In order to efficiently and economically process these large credit data and complex credit risk metrics, there is a need for developing or introducing specialized/dedicated components in a credit risk modelling/analysis system and/or utilizing cloud and open source platforms.

To solve these problems, according to certain aspects, embodiments in the present disclosure relate to techniques for executing models applied to existing credit data using relational database metadata, e.g., a schema representing structures of tables and constraints. A system (e.g., risk modelling or analysis system) may provide a model wrapper as a model abstraction layer to execute a model or a methodology relating to a credit risk. In some embodiments, the model wrapper may execute a model or a methodology by generating a code based on relational database metadata. For example, the model wrapper may receive or take metadata, generate codes (e.g., Java or Python) based on metadata, and run or execute the code (e.g., to perform amortization). In this manner, the system can automatically generate and execute a code relating to a credit risk model or a methodology without manually writing a specific code for such model or methodology.

In some embodiments, the system may read relational database metadata and model or methodology data. The metadata may include data relating to a structure of a model including one or more equations. For example, a model relating to a credit risk can be represented by the following equation:

$$y=a*m(x)+b \qquad \text{(Equation 1)}$$

where a is a coefficient, b is an intercept, and m is a function or a transformation (e.g., logarithmic function).

In some embodiments, the model or methodology data may include one or more logical tables that represent a structure of Equation 1. In some embodiments, the model or methodology may include logical tables representing equations, terms (e.g., Equation 1 has two terms a*m(x) and b), and/or transformations. For example, an "Equation" table may include name of an equation, and one or more references to terms of the equation in a "Term" table. The "Term" table may include one or more values of one or more coefficients of a term, one or more values of one or more intercepts of the term, and/or references to one or more to transformations of the term (in a "Transformation" table). The "Transformation" table may include a type or a transformation (e.g., logarithmic function). The metadata may include a schema or an entity-relationship diagram representing the "equation" table, the "term" table, and the "transformation" table.

In some embodiments, the system (or model wrapper) may extract or read or identify a definition of a model at runtime by reading the metadata. For example, the system may identify the equation of y=a*m(x)+b without identifying values of a and b and a type of transformation m(x).

In some embodiments, upon identification of a definition of a model (e.g., y=a*m(x)+b), the system may identify a name of the equation and values/types of a, b, and m(x) by reading the model or methodology data. For example, the system may read a name of the equation stored in the "Equation" table, values of a, b stored in the "Term" table, and a type of m(x) stored in the "Transformation" table.

In some embodiments, upon identification of name, coefficient(s), intercept(s), and transformation type(s) of the equation, the system (or abstraction wrapper) may generate a code (e.g., Java or Python) for executing the equation (as a model) applied to existing credit data stored in databases (e.g., portfolio data and/or scenario data). In some embodiments, the generated code may access relational databases and execute one or more database queries (e.g., SQL query).

According to certain aspects, embodiments in the present disclosure relate to techniques for executing models applied to existing credit data using relational database metadata even without implementing codes of the specific models. In some embodiments, a system may provide a model abstraction by executing a model wrapper. In some embodiments, the system (or model wrapper) may generate a file (e.g., a model definition file) representing an identified definition of the model (e.g., one or more equations without values or coefficients/intercepts and types of transformations) using relational database metadata. In some embodiments, the system (or model wrapper) may generate a model definition file representing an identified definition of the model and identified values of coefficients/intercepts and types of transformations, using relational database metadata and model/methodology data. In some embodiments, the system may generate a model definition file in a predetermined file format (e.g., JSON) representing one or more equations. In some embodiments, the system may generate a model definition file in a human-readable format (e.g., MS-Word) based on the identified definition of the model, and convert it to a machine-readable file format or a predetermined file format (e.g., JSON). In some embodiments, the system may not generate a model definition file but use a model definition file which already exists or is uploaded. In some embodiments, upon generation of a model definition file, the system (or model wrapper) may read the file and execute the one or more equations (as a model) applied to existing credit data stored in databases (e.g., portfolio data and/or scenario data). In some embodiments, the system (or abstraction wrapper) may access relational databases and execute one or more database queries (e.g., SQL query).

In some embodiments, a system (or model wrapper) may execute models applied to existing credit data using relational database metadata even without implementing codes or generating model definition files. For example, upon identifying a definition of one or more equations and values of coefficients/intercepts and types of transformations thereof using metadata and model/methodology data, the system (or model wrapper) may execute, based on the identified definition/values/types, the one or more equations (as a model) applied to existing credit data stored in databases (e.g., portfolio data and/or scenario data).

According to certain aspects, embodiments in the present disclosure relate to techniques for executing frameworks applied to existing credit data using relational database metadata. A framework may be a collection of (1) equation-based models, (2) models without equations and/or (3) methodologies for applying to a particular loan portfolio of a particular user to calculate a financial process relating to the particular loan portfolio or the particular user. For example, a framework may include (1) equation-based models such as probability of default (PD) or loss given default (LGD) or the exposure at default (EAD); (2) models without equations, such as an amortization of loan; and/or (3) methodologies such as proxy methodology, general ledger (GL) methodology, and bank confirmation letter (BCL) methodology. A framework can define how to calculate (1) equation-based models, (2) models without equations and/or (3) methodologies, for a given loan portfolio or a given user. Different frameworks can define different calculation methods, e.g., a framework for calculating a fixed rate amortization, and a framework for calculating a dynamic rate amortization.

In some embodiments, mapping or model abstraction can be executed at a framework level. A system (e.g., risk modelling or analysis system) may provide a model wrapper as a model abstraction layer to execute a framework for a given loan portfolio or a given user. The model wrapper may execute the framework by executing each of one or more models or methodologies of a framework applied to data of the given loan portfolio in manners described above. For example, the model wrapper may execute the framework by automatically generating a code based on relational database metadata or without implementing codes of the specific models (e.g., by generating a model definition file or without generating a model definition file). In this manner, the system can automatically execute a framework for a given loan portfolio or a given user without manually writing a specific code.

In some embodiments, a system (e.g., risk modelling or analysis system) may store or provide (1) metadata, (2) user or user environment data (e.g., user security, environment security), (3) loan portfolio data including a plurality of portfolios, (4) scenario data including a plurality of scenarios (e.g., stress scenarios, predetermined macro-economic scenarios), and/or (5) framework, model, methodology data relating to credit risk modelling and/or analysis. In some embodiments, these data (1)-(5) may be stored in one or more databases (e.g., relational databases). Metadata may be relational database metadata representing an organization or structure of these data (2)-(5). Metadata may include database schemas or entity-relationship diagram data. In some embodiments, the framework, model, methodology data may include a plurality of frameworks, a plurality of models, and/or a plurality of methodologies. The plurality of frameworks may be mapped to the plurality of portfolios and the plurality of scenarios. The plurality of frameworks may be mapped to a plurality of models and a plurality of methodologies.

In some embodiments, the system may include a model wrapper (or abstraction layer) configured to automatically perform a frame-level execution without manually writing codes executable in the system. The model wrapper may be implemented in programming languages such as Java or Python. The system or a model wrapper may concurrently execute multiple models relating to a framework according to models as defined in the metadata and framework/model/methodology data. That is, calculation pattern (e.g., database query pattern) of a model may be static as long as the metadata and/or framework/model/methodology data does not change. In some embodiments, the model wrapper may create or generate processes corresponding to the multiple models relating to the framework. In some embodiments, the system may include a data filter configured to sample data (e.g., frame-level data) with a set of features (or columns). Upon completion of filtering data, the system or model wrapper may execute models (e.g., execute corresponding processes) applied to filtered data. For example, the model wrapper may concurrently execute one or more models (e.g., execute corresponding processes) including exposure at default (EAD), loss given default (LGD), expected credit loss (ECL), one or more probability of default (PD) models, one or more amortization models (e.g., fixed-rate amortization or dynamic-rate amortization). In some embodiments, the model wrapper may obtain or generate a result of a model (e.g., a credit score based on the model) based on results of other models (e.g., credit scores based on other models). For example, the model wrapper may obtain or generate a result of ECL by multiplying a result of EAD, a result of PD, and a result of LGD. In some embodiments, the system may include an execution manager configured to allocate a set of (pipeline) stages to the models or processes to be concurrently executed. In some embodiments, the system may execute a methodology level execution by concurrently executing a plurality of methodologies (e.g., proxy methodology, general ledger, and bank confirmation letter (BCL) methodology). In some embodiments, the system may store results of executed models and/or executed methodologies in a distributed file system, for example, Hadoop Distributed File System (HDFS).

In some embodiments, the system may include an alert and analysis manager configured to transmit a notification based on results of executed models or methodologies. For example, the system may compare a result of ECL (as a credit loss value) based on portfolio data of a particular user, with a threshold and determine whether the credit loss value is greater than the threshold. Upon determining that the credit loss value is greater than the threshold, the system may perform a notification process by transmitting an alert to the particular user.

According to certain aspects, embodiments in the present disclosure relate to techniques for performing a column-wise calculation, instead of a row-wise calculation, based on relational database metadata (or schema) for improved or optimized performance (e.g., fast processing) of calculating models or methodologies relating to credit data. In some embodiments, a system (e.g., risk modelling and analysis system) may perform column-by-column data processing on a logical table in relational databases. In some embodiments, the system may identify, as a performance bottleneck when executed by row-by-row data processing, a model or a methodology relating to a set of columns that have self-dependency (e.g., calculation of data in a column in a row may require reference to data in another column in the previous row). For example, the system may identify a set of columns having self-dependency using relational database metadata, for example, a logical table representing dependency between columns. Then, the system (e.g., a model wrapper) may execute the model or the methodology on the identified set of columns by performing column-by-column data processing. In some embodiments, a risk modelling and analysis system can process credit data by partitioning a plurality of columns, in which data in one or more columns in one row depend on data in one or more columns in another row, into multiple sets of columns based on relational database metadata. In some embodiments, the relational database metadata can specify dependency structure of a logical table. The system can use the dependency structure to partition a plurality of columns into multiple sets of columns such that the multiple column sets do not have dependency on each other. In performing the column dependent calculations, the system can take advantage of distributed computations over a cluster of computing nodes. In some embodiments, the system can assign calculations on a first set of partitioned columns to a computing node so that the computing node can execute the calculations in a dedicated execution unit in the same computing node (e.g., a task executed in a working node). In some embodiments, the system can assign calculations on a second set of partitioned column, which do not contain a column from the first set of partitioned columns, to an execution unit other than the execution unit dedicated to the calculations on the first set of partitioned columns.

According to certain aspects, a system may include one or more processors configured to receive a set of data containing relational database metadata, model data, and customer loan data. The one or more processors may be configured to configure a first model and a second model based on the model data and the metadata. The one or more processors may be configured to partition, based on the relational database metadata, the customer loan data into first data and second data. The one or more processors may be configured to execute, by executing a first execution unit, the first model using the first data of the customer loan data to output a first credit risk score. The one or more processors may be configured to execute, by executing a second execution unit different from the first execution unit, the second model using the second data of the customer loan data to output a second credit risk score. The one or more processors may be configured to generate a third credit risk score based on the first credit risk score and the second credit risk score. The one or more processors may be configured to transmit a notification based on the third credit risk score.

At least one of the first and second models may represent at least one equation relating to a credit risk. The method may include executing one or more models including one of fixed-rate amortization or adjustable-rate amortization.

In executing the first model, the one or more processors may be configured to generate a first code based on the first model and execute the first code using the first data. In executing the second model, the one or more processors may be configured to generate a second code based on the second model and executing the second code using the second data.

The one or more processors may be further configured to configure one or more databases in a plurality of logical tables, each comprising at least one logical row and at least one logical column. The one or more processors may be further configured to store the set of data into the plurality of logical tables such that the metadata includes entities and relationships represented by the plurality of logical tables. In configuring the first model and the second model, the one or more processors may be configured to extract definitions of the first and second models from the entities and relationships. At least one of the first and second models may represent at least one equation relating to a credit risk. The plurality of logical tables may include at least one logical table representing the at least one equation.

The at least one equation may include at least one of transformation, coefficient, scale, or intercept. The plurality of logical tables may include at least one logical table representing the at least one of transformation, coefficient, scale, or intercept of the at least one equation.

The one or more databases may store the customer loan data as data items in a first logical table including a plurality of logical rows and a plurality of logical columns. The first data may correspond to data items of the customer loan data in a first set of logical columns among the plurality of logical columns. The second data may correspond to data items of the customer loan data in a second set of logical columns that do not include any column of the first set of logical columns.

The first execution unit and the second execution unit may be executed in parallel. The first execution unit and the second execution unit may be executed on different nodes in a cluster of computers.

Embodiments in the present disclosure can have the following advantages. First, some embodiments can provide useful techniques for reducing the development time for implementing specific models. For example, a system according to some embodiments can automatically generate and execute a code relating to a credit risk model or a methodology without manually writing a specific code for such model or methodology.

Second, some embodiments can provide useful techniques for efficiently processing data having an inter-dependency. For example, a system according to some embodiments can (1) decompose calculations into multiple set of columns based on inter-dependency of data using relational database metadata, and (2) utilize parallel and distributed calculations on the multiple set of columns over a cluster of computing nodes so as to scale better as the data volume grows.

Figure 1:
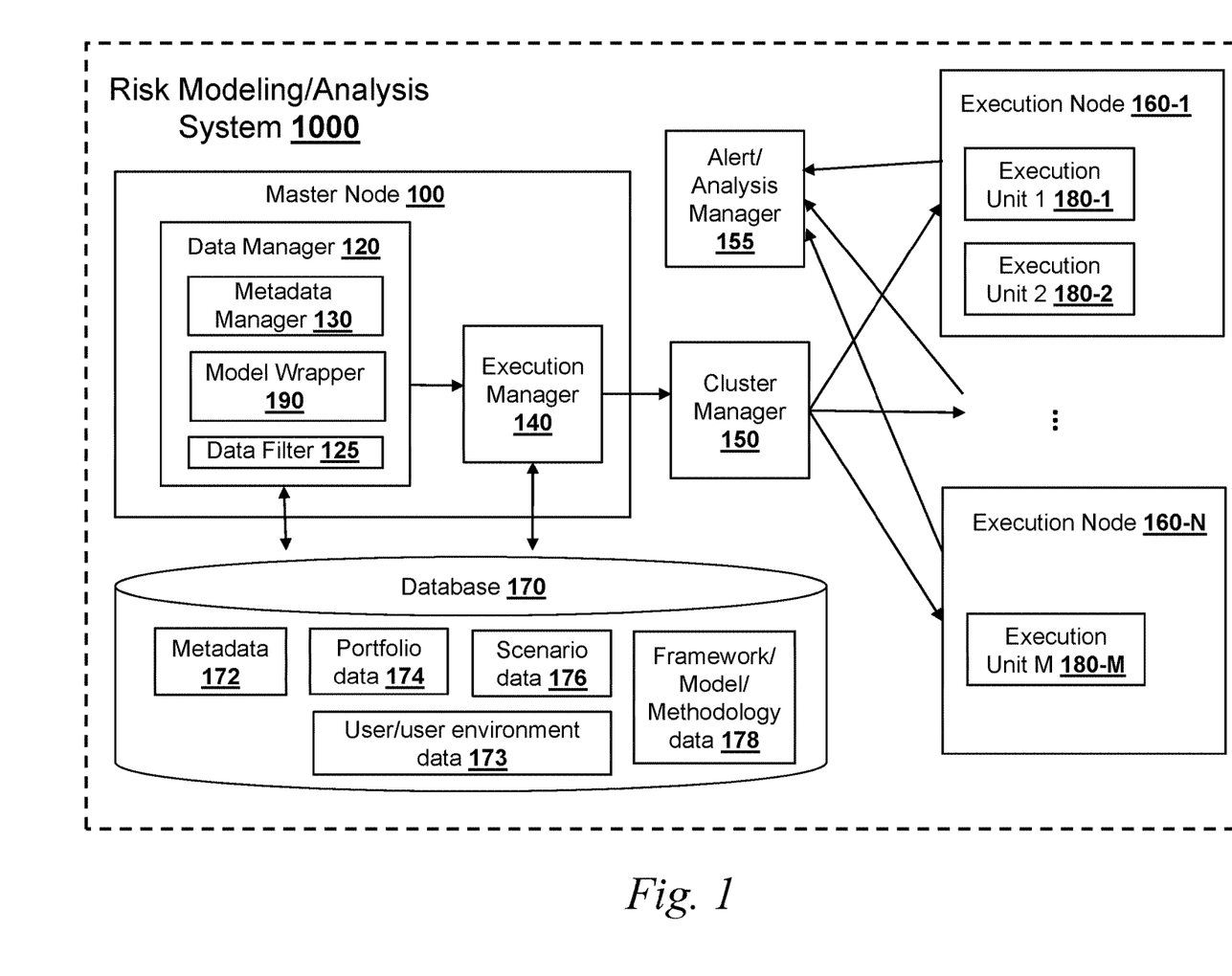
FIG. 1 is a block diagram showing a system for risk modelling and analysis, according to an embodiment.

FIG. 1 is a block diagram showing a system for risk modelling and analysis, according to some embodiments. A risk modelling and analysis system 1000 may include a master node 100, a database 170, a cluster manager 150, an alert/analysis manager 155, and a cluster of execution nodes 160-1 through 160-N (N is a positive integer greater than 1). In some embodiments, the master node 100, the cluster manager 150, and the execution nodes 160-1 through 160-N may be implemented in one or more computing systems each having similar configuration as that of the computing system 200 (see FIG. 2).

The master node 100 (core node or driver node) may be configured to create and process a distributed dataset or a distributed collection of data by partitioning data into partitions or columns of data and allocating the partitions or columns to one or more execution nodes. The partitions or columns can be run in parallel thereby improving performance of processing of large data.

The database 170 may store or provide (1) metadata 172, (2) user or user environment data (e.g., user security, environment security) 173, (3) loan portfolio data 174 including a plurality of portfolios, (4) scenario data 176 including a plurality of scenarios (e.g., stress scenarios, predetermined macro-economic scenarios), and/or (5) framework, model, methodology data 178 relating to credit risk modelling and/or analysis. In some embodiments, these data (1)-(5) may be stored in one or more databases (e.g., relational databases).

Metadata 172 may be relational database metadata representing an organization or structure of these data (2)-(5). Metadata 172 may include database schemas or entity-relationship diagram data. For example, the metadata 172 may include data relating to entities and relationships (e.g., a logical table structure or a schema of a relational database) represented by the scenario data or the portfolio data or the framework, model, methodology data 178, stored in the database.

The portfolio data 174 may include risk portfolio data (e.g., data relating to loans, credit cards, lines of credits, etc.). The scenario data 176 may include data representing multiple scenarios in which credit risk modelling/analysis are often performed with large credit data based on a number of credit risk models or metrics. The framework, model, methodology data 178 may include data relating to credit risk models. The credit risk models may include models or metrics for (1) stress testing (macro-stress testing (MST), comprehensive capital analysis and review (CCAR)), (2) regulatory capital (e.g., risk-weighted assets (RWA)), (3) expected credit losses (ECL) allowance, (4) advanced internal rating-based (AIRB), (5) International Financial Reporting Standard (e.g., IFRS 9), (6) probability of default (PD) Models, and (7) loss given default (LGD) models. The framework, model, methodology data 178 may include a plurality of frameworks (e.g., a set of models and/or methodologies relating to a particular loan portfolio or a particular user), a plurality of models, and/or a plurality of methodologies (e.g., proxy methodology, general ledger (GL) methodology, and bank confirmation letter (BCL) methodology).

The master node 100 may include a data manager 120 and an execution manager 140. The data manager 120 may be a software module, which may be executed by master node 100. The data manager 120 may be configured to access data from, or store data into, the database 170. In some embodiments, the data manager 120 may use a Structured Query Language (SQL) interface or module to access data from, or store data into, the database 170. The data manager 120 may create a distributed dataset or a distributed collection of data by partitioning data into partitions or columns of data.

The data manager 120 may include a metadata manager 130, a model wrapper 190, and a data filter 125, each of which may be executed by master node 200. The metadata manager 130 may be configured to manage or update or maintain relational database metadata 172 (e.g., schema or entity-relationship shown in FIG. 3).

The model wrapper 190 may execute models applied to existing credit data using relational database metadata (e.g., metadata 172). The model wrapper 190 may be provided as a model abstraction layer to execute a model or a methodology relating to a credit risk.

In some embodiments, the model wrapper 190 may execute models applied to existing credit data using relational database metadata even without implementing codes or generating model definition files. For example, upon identifying a definition of one or more equations and values of coefficients/intercepts and types of transformations thereof using metadata and model/methodology data (see FIG. 3), the model wrapper 190 may execute, based on the identified definition/values/types, the one or more equations (as a model) applied to existing credit data stored in databases (e.g., portfolio data and/or scenario data).

The data filter 125 may be configured to filter data by sampling data (e.g., frame-level data) with a set of features (or columns). Upon completion of filtering data, the model wrapper 190 may execute models (e.g., execute corresponding processes) applied to filtered data.

The execution manager 140 may be a software module, which may be executed by master node 100. The execution manager 140 may be configured to perform pipelining transformations on the partitions or columns generated by the data manager 120, and then create a physical execution plan with set of (pipeline) stages to process the partitions or columns. In some embodiments, each stage may contain a plurality of execution units or tasks (e.g., execution unit 1 (180-1), execution unit 2 (180-2), . . . , execution unit M (180-M) where M is an integer greater than 1) so that each execution unit or task corresponding to a partition or column can be run on an execution node to which the partition or column is allocated. In some embodiments, the execution manager 140 may serialize a plurality of partitions or columns, and (2) send, ship or deliver the partitions or columns to the cluster manager 150.

The cluster manager 150 may be configured to configure and run one or more processes or applications on a cluster of execution nodes (working nodes or slave nodes). In some embodiments, the cluster manager may provide resources to execution nodes as need so that the execution nodes can operate accordingly. In some embodiments, the cluster manager 250 may be configured to (1) receive the serialized partitions or columns from the execution manager 240, (2) deserialize the partitions or columns, and (3) send, ship or deliver each partition or column to an execution node to which that partition or column is allocated. The cluster manager 250 may implemented in a computing system having similar configuration as that of the computing system 300 (see FIG. 3). In some embodiments, the cluster manager 250 may a software module, which may be executed by master node 200.

In response to (1) allocating by the data manager a partition or column to a particular execution node and (2) receiving the partition at the particular execution node, the particular execution node may be configured to execute a process or an application to process the partition or the column in a dedicated execution unit (or task). In some embodiment, a single execution unit or task may be generated for a single partition, so that the execution unit can be run inside a virtual machine (e.g., Java virtual machine) of an execution node to which that partition is allocated.

The alert/analysis manager 155 may be configured to transmit a notification based on results of executed models or methodologies. For example, the alert/analysis manager 155 may compare a result of ECL (as a credit loss value) based on portfolio data of a particular user, with a threshold and determine whether the credit loss value is greater than the threshold. Upon determining that the credit loss value is greater than the threshold, the system may perform a notification process by transmitting an alert to the particular user].

Figure 2:
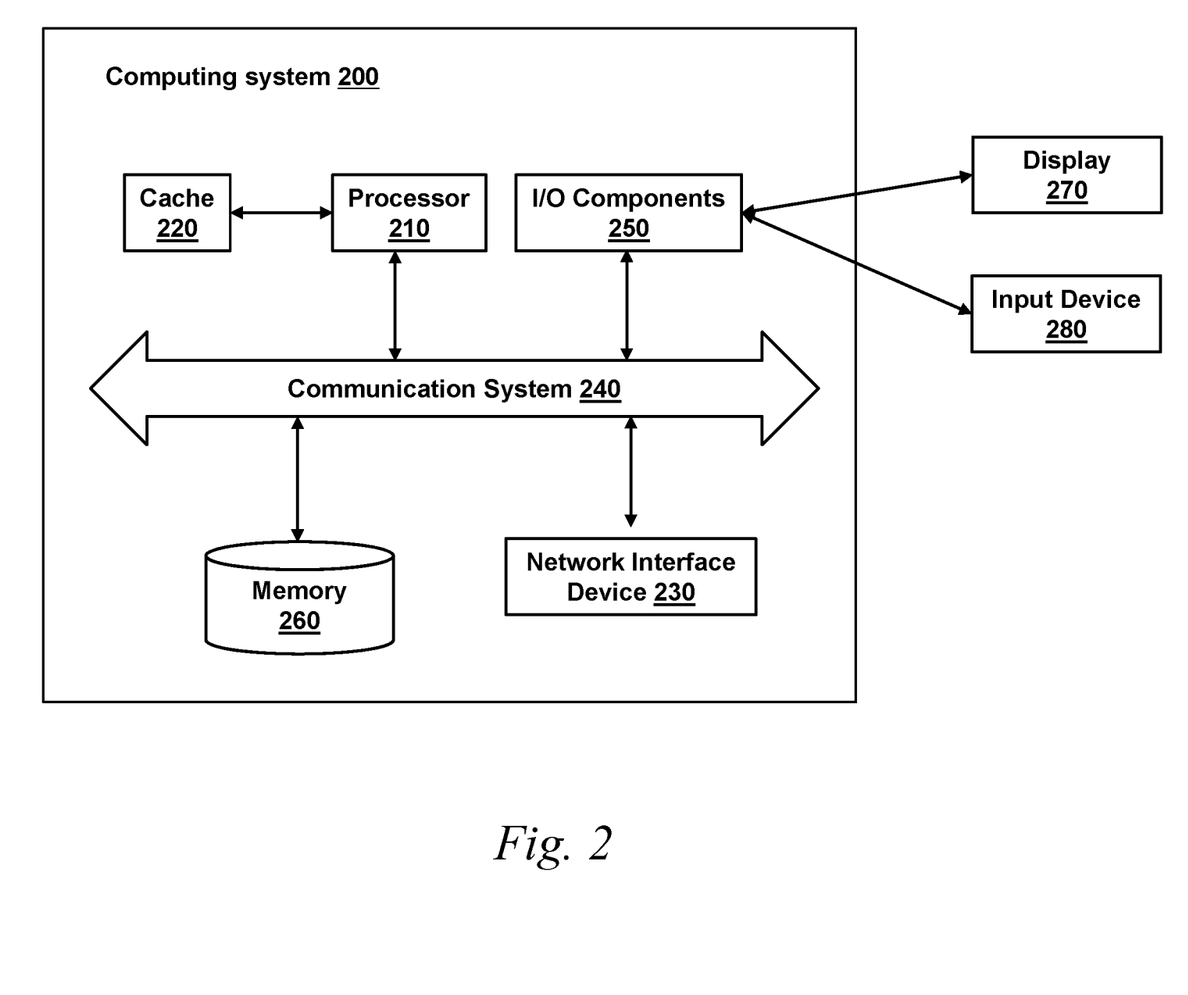
FIG. 2 is a block diagram showing an example of a computing system, according to an embodiment.

FIG. 2 is a block diagram showing an example of a computing system, according to some embodiments. An illustrated example computing system 200 includes one or more processors 210 in communication, via a communication system 240 (e.g., bus), with memory 260, at least one network interface controller 230 with network interface port for connection to a network (not shown), and other components, e.g., input/output ("I/O") components 250. Generally, the processor(s) 210 will execute instructions (or computer programs) received from memory. The processor(s) 210 illustrated incorporate, or are directly connected to, cache memory 220. In some instances, instructions are read from memory 260 into cache memory 220 and executed by the processor(s) 210 from cache memory 220.

In more detail, the processor(s) 210 may be any logic circuitry that processes instructions, e.g., instructions fetched from the memory 260 or cache 220. In many implementations, the processor(s) 210 are microprocessor units or special purpose processors. The computing device 200 may be based on any processor, or set of processors, capable of operating as described herein. The processor(s) 210 may be single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 200 may have any number of memory devices 260.

The cache memory 220 is generally a form of computer memory placed in close proximity to the processor(s) 210 for fast read times. In some implementations, the cache memory 220 is part of, or on the same chip as, the processor(s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processor(s) 210. In some implementations, the network interface controller 230 is part of a processor 210. In some implementations, the computing system 200 has multiple network interfaces controlled by a single controller 230. In some implementations, the computing system 200 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 230 implements one or more network protocols such as Ethernet. Generally, a computing device 200 exchanges data with other computing devices via physical or wireless links through a network interface. The network interface may link directly to another device or to another device via an intermediary device, e.g., a network device such as a hub, a bridge, a switch, or a router, connecting the computing device 300 to a data network such as the Internet.

The computing system 200 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 200 may include an interface (e.g., a universal serial bus (USB) interface) for connecting input devices, output devices, or additional memory devices (e.g., portable flash drive or external media drive). In some implementations, a computing device 200 includes an additional device such as a co-processor, e.g., a math co-processor can assist the processor 210 with high precision or complex calculations.

The components 250 may be configured to connect with external media, a display 270, an input device 280 or any other components in the computing system 200, or combinations thereof. The display 270 may be a liquid crystal display (LCD), an organic light emitting diode (OLED), a flat panel display, a solid state display, a cathode ray tube (CRT), a projector, a printer or other now known or later developed display device for outputting determined information. The display 370 may act as an interface for the user to see the functioning of the processor(s) 210, or specifically as an interface with the software stored in the memory 260.

The input device 280 may be configured to allow a user to interact with any of the components of the computing system 200. The input device 280 may be a plurality pad, a keyboard, a cursor control device, such as a mouse, or a joystick. Also, the input device 280 may be a remote control, touchscreen display (which may be a combination of the display 270 and the input device 280), or any other device operative to interact with the computing system 200, such as any device operative to act as an interface between a user and the computing system 200.

Figure 3:
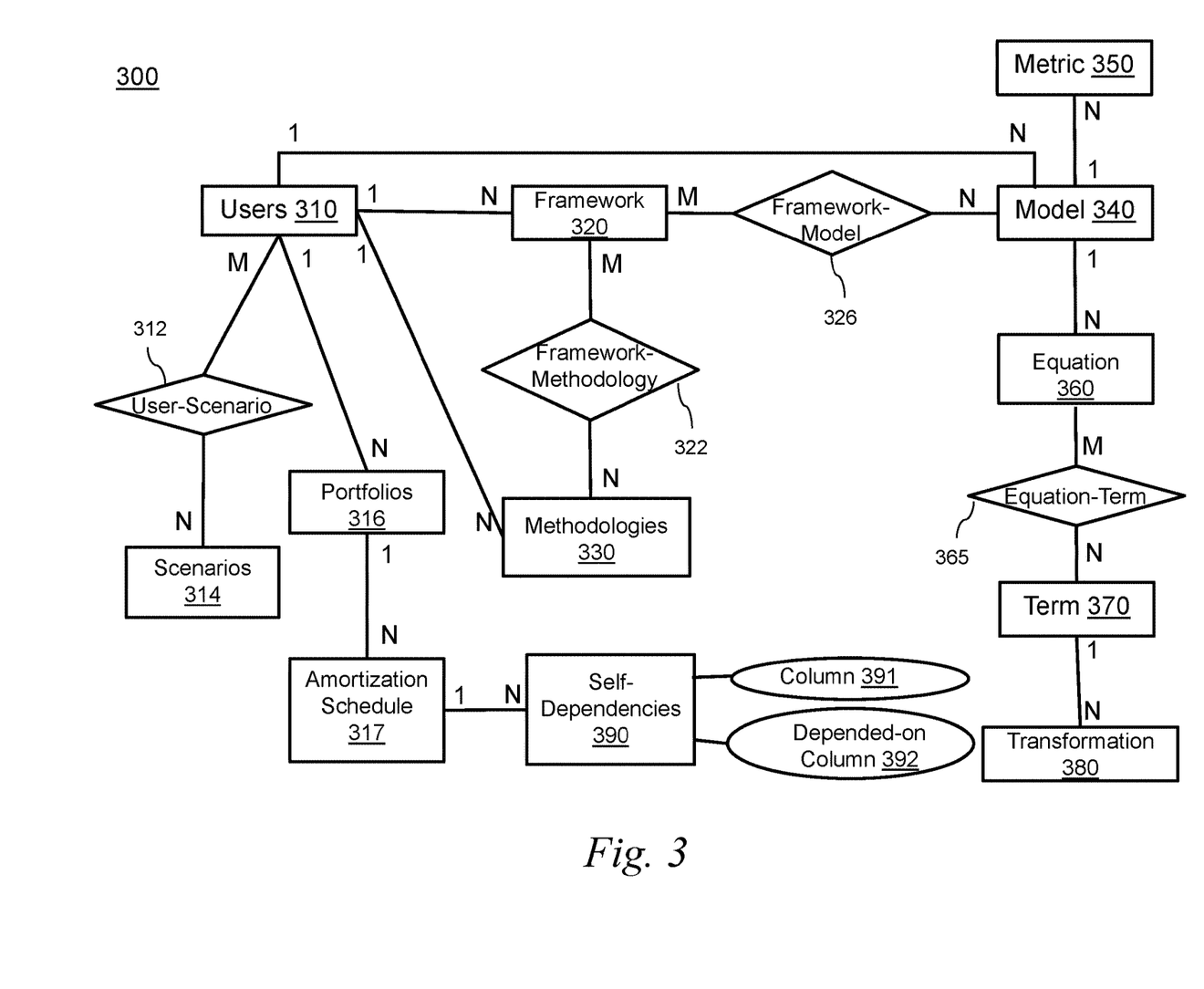
FIG. 3 is a diagram depicting an example metadata, according to an embodiment.

FIG. 3 is a diagram depicting an example metadata 300, according to some embodiments. Referring to FIGS. 2 and 3, the database 170 may store or provide (1) metadata 172 or 300, (2) user or user environment data (e.g., user security, environment security) 173, (3) loan portfolio data 174 including a plurality of portfolios, (4) scenario data 176 including a plurality of scenarios (e.g., stress scenarios, predetermined macro-economic scenarios), and/or (5) framework, model, methodology data 178 relating to credit risk modelling and/or analysis. The metadata 172 or 300 may be relational database metadata representing an organization or structure of these data (2)-(5). Metadata 172 or 300 may include database schemas or entity-relationship diagram data. For example, the metadata 300 represents entities, relationships and constraints of the data (2)-(5). Entities of the metadata 300 include users 310, scenarios 314, portfolios 316, amortization schedule 317, framework 320, methodologies 330, model 340, metric 350, equation 360, term 370, transformation 380, and self-dependencies 390, which correspond to logical tables of "users", "scenarios", "portfolios", "amortization schedule", "framework", "methodologies", "model", "metric", "equation", "term", "transformation" and "self-dependencies", respectively, stored in user/user environment data 173, portfolio data 174, scenario data 176, and framework/model/methodology data 178 (see FIG. 1). Relationships of the metadata 300 include user-scenario 312, framework-methodology 322, framework-model 326, and equation-term 365, each of which represents M-to-N relationship between two entities.

The entity of framework 320 represents a structure of the "framework" table stored in framework/model/methodology data 178. A framework may be a collection of (1) equation-based models (represented by the "equation" table), (2)

models without equations (represented by the "metric" table), and/or (3) methodologies (represented by the "methodologies" table) for applying to a particular loan portfolio of a particular user to calculate a financial process relating to the particular loan portfolio or the particular user. In other words, a framework can define how to calculate (1) equation-based models, (2) models without equations and/or (3) methodologies, for a given loan portfolio or a given user. The "framework" table may store a plurality of frameworks. As shown in FIG. 3, the plurality of frameworks may be mapped to (1) a plurality of portfolios (stored in the "portfolios" table), (2) a plurality of scenarios (stored in the "scenario table), (3) a plurality of models (stored in the "model" table) and (4) a plurality of methodologies (stored in the "methodologies" table). Each of the plurality of models may be mapped to a plurality of equations (stored in the "equation" table). The plurality of equations may be mapped to a plurality of terms (stored in the "term" table). Each of the plurality of terms may be mapped to a plurality of transformation (stored in the "transformation" term).

Figure 4:
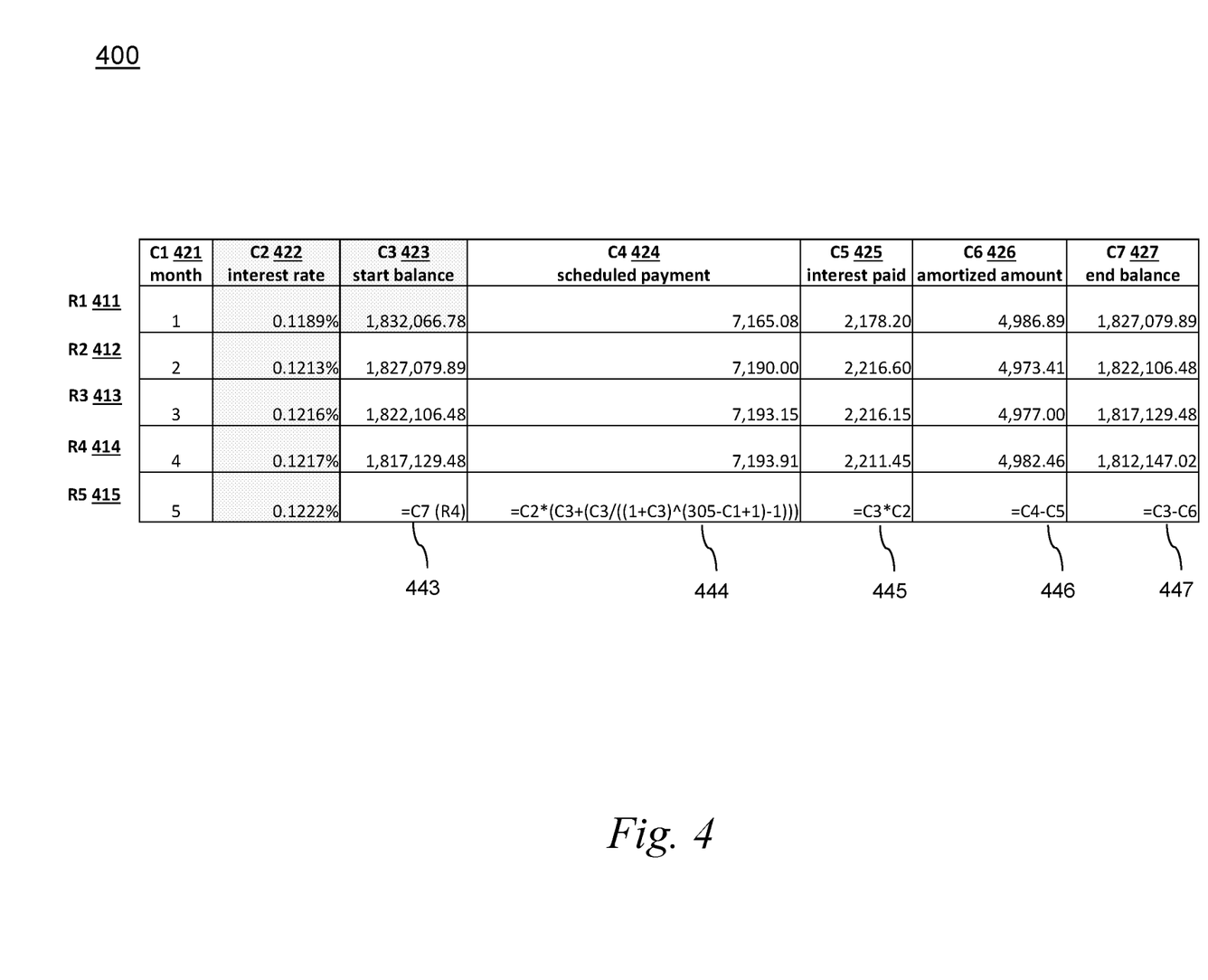
FIG. 4 is a diagram depicting an example table of portfolio data, according to an embodiment.

The entity of self-dependencies 390 may represent a constraint that the entity of amortization schedule 317 has self-dependency between columns (e.g., a column represented by column 391 depends on a column represented by depended-on column 391). Using the constraint of self-dependencies 390, a risk modeling/analysis system (e.g., system 1000 in FIG. 1) can identify multiple sets of columns in a logical table, each set having self-dependency. For example, FIG. 4 shows an example logical table 400 which represents a (loan) "amortization schedule" table whose structure is consistent with the entity 317 in FIG. 3. The "amortization schedule" table 400 has a plurality of columns 421-427 including C1 (month), C2 (interest rate), C3 (start balance), C4 (scheduled payment), C5 (interest paid), C6 (amortized amount), and C7 (end balance). The "amortization schedule" table has a plurality of rows 411-415 including R1, R2, R3, R4, and R5, which correspond to month 1, month 2, month 3, month 4, and month 5, respectively. This "amortization schedule" table has a time-series dependency 443 such that the start balance for the next month is dependent from the end balance of the current month. For example, start balance on month 5 (C3 of R5) is dependent on end balance from month 4 (C7 of R4), which in turn is dependent on end balance from month 3 (C7 of R3). This loan amortization schedule table also has other dependencies 444, 445, 446, 447 such that C4 (scheduled payment), C5 (interest paid), C6 (amortized amount), and C7 (end balance) of the current month depend on C3 (start balance) of the same month, which in turn is dependent on C7 (end balance) of the previous month. These dependencies can be represented in the metadata of self-dependencies 390. For example, the "self-dependencies" table may store (C3, C7), (C4, C3), (C5, C3), (C6, C3), and (C7, C3) in a pair of columns ("column", "depended-on column") to represent the dependencies 443, 444, 445, 446, 447.

In some embodiments, a system (e.g., system 1000 in FIG. 1) may perform a column-wise calculation, instead of a row-wise calculation, based on relational database metadata (e.g., metadata 172 or 300) for improved or optimized performance (e.g., fast processing) of calculating models or methodologies relating to credit data. In some embodiments, the system may perform column-by-column data processing on a logical table in relational databases. In some embodiments, the system may identify, as a performance bottleneck when executed by row-by-row data processing, a model or a methodology relating to a set of columns that have self-dependency (e.g., calculation of data in a column in a row may require reference to data in another column in the previous row). For example, the system may identify a set of columns having self-dependency using relational database metadata, for example, the entity 390 of the "self-dependencies" table (see FIG. 3). Then, the system 1000 (or model wrapper 190) may execute the model or the methodology on the identified set of columns by performing column-by-column data processing. In some embodiments, the relational database metadata can specify dependency structure of a logical table (e.g., the entity 390 of "self-dependencies" table in FIG. 3). The system can use the dependency structure to partition a plurality of columns (e.g., C1-C7 in FIG. 4) into multiple sets of columns such that the multiple column sets do not have dependency on each other. For example, based on the "self-dependencies" table, the system (or model wrapper) may partition C1-C7 of the table 400 into a first set of columns (e.g., C3-C7) having self-dependencies and a second set of columns (e.g., C1-C2), which do not have self-dependencies. In performing the column dependent calculations, the system can take advantage of distributed computations over a cluster of computing nodes. In some embodiments, the system can assign calculations on the first set of partitioned columns (e.g., C3-C7) to a computing node (e.g., execution node 160-1) so that the computing node can execute the calculations in a dedicated execution unit in the same computing node (e.g., a task executed in a working node). In some embodiments, the system can assign calculations on the second set of partitioned column (e.g., C1-C2), which do not contain a column from the first set of partitioned columns, to an execution unit (e.g., execution node 160-2) other than the execution unit dedicated to the calculations on the first set of partitioned columns.

Figure 5:
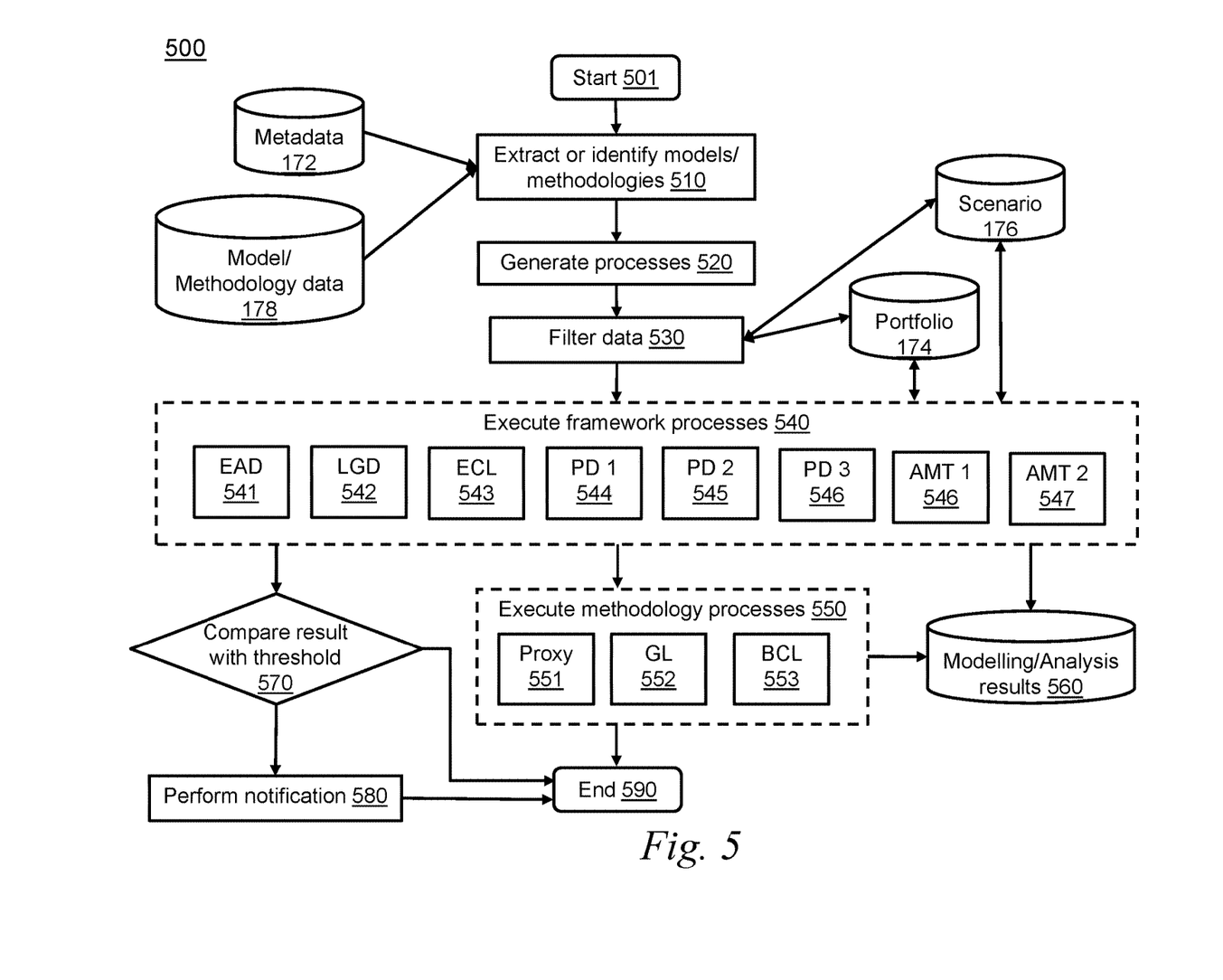
FIG. 5 is a flowchart illustrating a methodology for executing models based on metadata, according to an embodiment.

FIG. 5 is a flowchart illustrating a methodology for execute processes for modelling and/or analysis, based on metadata, according to some embodiments. FIG. 5 shows execution steps for executing processes based on metadata, according to a method 500. The method 500 may include execution steps 501, 510, 520, 530, 540, 550, 570, 580 and 590 performed in a risk modelling/analysis system (e.g., system 1000 in FIG. 1) including one or more processors (e.g., processor 210 in FIG. 2). It should be understood that the steps described herein are merely illustrative and additional or substitute steps should also be considered to be within the scope of this disclosure. Furthermore, methods with a fewer numbers of steps should also be considered to be within the scope of this disclosure.

At step 501, the system may start performing a risk modelling or analysis based on data stored in one or more databases (e.g., database 170) including metadata 172 or 300, portfolio data 174, scenario data 176, and framework/model/methodologies data 178.

At step 510, the system may extract or identify models/methodologies of a framework based on the metadata 172 or 300 and the framework/model/methodologies data 178. In some embodiments, the system (or model wrapper 190 in FIG. 1) may extract or identify models of a framework based on relational database metadata 172 or 300 and framework/model/methodology data 178 to execute models of a framework. The metadata (e.g., metadata 300 in FIG. 3) may include a structure or entity of a model 340, which corresponds to the "model" table including one or more equations (represented by the "equation" table). For example, a model relating to a credit risk can be represented by Equation 1.

In some embodiments, the framework/model/methodology data 178 may include one or more logical tables that represent a structure of Equation 1 (e.g., logical tables of "equation", "term" and "transform"). The "equation" table may represent equations, the "term" table may represent terms (e.g., Equation 1 has two terms a*m(x) and b), and the "transformation" table may represent transformations. For example, the "equation" table may include name of an equation, and one or more references to terms of the equation in the "term" table. The "term" table may include one or more values of one or more coefficients of a term, one or more values of one or more intercepts of the term, and/or references to one or more to transformations of the term (in the "transformation" table). The "transformation" table may include a type or a transformation (e.g., logarithmic function). As shown in FIG. 3, the metadata 300 may include a schema or an entity-relationship diagram representing the "equation" table, the "term" table, and the "transformation" table.

In some embodiments, the system (or model wrapper) may extract or read or identify a definition of a model at runtime by reading the metadata. For example, the system may identify the equation of y-a*m(x)+b without identifying values of a and b and a type of transformation m(x).

In some embodiments, upon identification of a definition of a model (e.g., y=a*m(x)+b), the system may identify a name of the equation and values/types of a, b, and m(x) by reading the framework/model/methodology data 178. For example, the system may read or identify a name of the equation stored in the "equation" table, values of a, b stored in the "term" table, and a type of m(x) stored in the "transformation" table.

At step 520, the system (or model wrapper) may generate processes corresponding to models/methodologies to be applied to existing credit risk data, e.g., portfolio data 176 and scenario data 174. In some embodiments, the system may automatically perform a frame-level execution using relational database metadata without manually writing codes executable in the system. In some embodiments, a model wrapper (e.g., model wrapper 190 in FIG. 1) as a model abstraction layer may execute a framework for a given loan portfolio or a given user. The model wrapper may execute the framework by executing each of one or more models or methodologies of a framework applied to data of the given loan portfolio in manners described above. For example, the model wrapper may execute the framework by automatically generating a code based on relational database metadata or without implementing codes of the specific models (e.g., by generating a model definition file or without generating a model definition file). In this manner, the system can automatically execute a framework for a given loan portfolio or a given user without manually writing a specific code.

In some embodiments, upon identification of name, coefficient(s), intercept(s), and transformation type(s) of the equation at step 510, the system (or abstraction wrapper) may generate a code (e.g., Java or Python) for executing the equation (as a model) applied to existing credit data stored in databases (e.g., portfolio data 174 and/or scenario data 176). In some embodiments, the generated code may access relational databases and execute one or more database queries (e.g., SQL query).

In some embodiments, the model wrapper 190 may execute a model or a methodology by generating a code based on relational database metadata. For example, the model wrapper 190 may receive or take metadata, generate codes (e.g., Java or Python) based on metadata, and run or execute the code (e.g., to perform amortization). In this manner, the system 1000 can automatically generate and execute a code relating to a credit risk model or a methodology without manually writing a specific code for such model or methodology.

In some embodiments, the model wrapper 190 may execute models applied to existing credit data using relational database metadata 172 or 300 even without implementing codes of the specific models. The model wrapper 190 may generate a file (e.g., a model definition file) representing an identified definition of the model (e.g., one or more equations without values or coefficients/intercepts and types of transformations) using relational database metadata (e.g., metadata 172 or 300). In some embodiments, the model wrapper 190 may generate a model definition file representing an identified definition of the model and identified values of coefficients/intercepts and types of transformations using relational database metadata (e.g., the metadata 172 or 300) and framework/model/methodology data (e.g., framework/model/methodology data 178). In some embodiments, the model wrapper 190 may generate a model definition file in a predetermined file format (e.g., JSON) representing one or more equations. In some embodiments, the model wrapper 190 may generate a model definition file in a human-readable format (e.g., MS-Word) based on the identified definition of the model, and convert it to a machine-readable file format or a predetermined file format (e.g., JSON). In some embodiments, the model wrapper 190 may not generate a model definition file but use a model definition file that already exists or is uploaded. In some embodiments, upon generation of a model definition file, the model wrapper 190 may read the file and execute the one or more equations (as a model) applied to existing credit data stored in databases (e.g., portfolio data 174 and/or scenario data 176). In some embodiments, the model wrapper 190 may access relational databases (e.g., database 170) and execute one or more database queries (e.g., SQL query).

The model wrapper 190 may be implemented in programming languages such as Java, Python. The system may concurrently execute multiple models relating to a framework according to models as defined in the metadata and framework/model/methodology data. That is, calculation pattern (e.g., database query pattern) of a model may be static as long as the metadata and/or framework/model/methodology data does not change. In some embodiments, the model wrapper 190 may create or generate processes corresponding to the multiple models relating to the framework.

At step 530, the system may filter data, e.g., portfolio data 176 and scenario data 174, to be inputted to the processes generated at step 520. In some embodiments, the system may include a data filter (e.g., data filter 125) configured to sample data (e.g., frame-level data) with a set of features (or columns).

At step 540, the system may execute processes corresponding to the models of the framework. Upon completion of filtering data, the system (or model wrapper 190) may execute models (e.g., execute corresponding processes) applied to filtered data prepared at step 530. For example, the model wrapper 190 may concurrently execute one or more models (e.g., execute corresponding processes) including exposure at default (EAD), loss given default (LGD), expected credit loss (ECL), one or more probability of default (PD) models, one or more amortization models (e.g., fixed-rate amortization or dynamic-rate amortization). In some embodiments, the system may include an execution manager (e.g., execution manager 140 in FIG. 1) configured to allocate a set of (pipeline) stages to processes corresponding to the models (e.g., EAD, LGD, ECL, PD, and/or amortization models) to be concurrently executed. In some embodiments, the model wrapper 190 may obtain or generate a result of a model (e.g., a credit score based on the model) based on results of other models (e.g., credit scores based on other models). For example, the model wrapper 190 may obtain or generate a result of ECL by multiplying a result of EAD, a result of PD, and a result of LGD. In some embodiments, the system may store results of executed models in a storage 560 for modelling/analysis results. In some embodiments, the storage 560 may be a distributed file system, for example, Hadoop Distributed File System (HDFS).

At step 550, the system may execute processes corresponding to the methodologies of the framework. In some embodiments, the system may execute a methodology level execution by concurrently executing a plurality of methodologies (e.g., proxy methodology, general ledger (GL), and bank confirmation letter (BCL) methodology)). In some embodiments, the execution manager (e.g., execution manager 140 in FIG. 1) may allocate a set of (pipeline) stages to processes corresponding to the methodologies (e.g., proxy, GL, BCL) to be concurrently executed. In some embodiments, the system may store results of executed methodologies in the storage 560 for modelling/analysis results.

At step 570, the system may compare a result of the processes or models executed at step 540. For example, the system may include an alert and analysis manager (e.g., alert and analysis manager 155 in FIG. 1) configured to (1) compare a result of ECL (as a credit loss value) based on portfolio data of a particular user, with a threshold, and (2) determine whether the credit loss value is greater than the threshold.

At step 580, the system may perform a notification based on a result of the comparison at step 570. In some embodiments, in response to determining that the credit loss value is greater than the threshold (at step 570), the alert and analysis manager may perform a notification process by transmitting a notification or an alert to the particular user.

At step 590, the system may complete or end a risk modelling or analysis.

Figure 6:
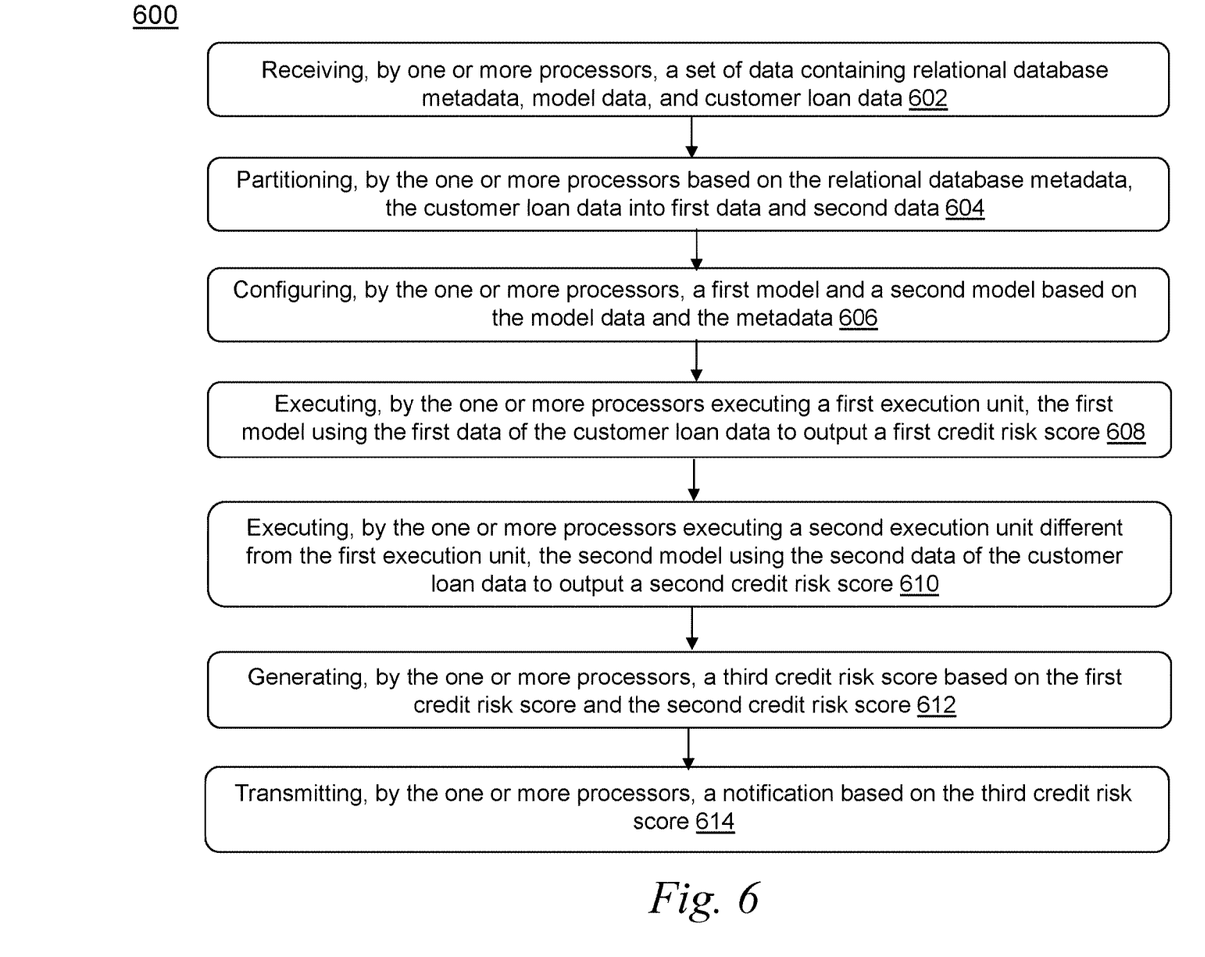
FIG. 6 is a flowchart illustrating a methodology for executing models based on metadata, according to an embodiment.

FIG. 6 is a flowchart illustrating a methodology for executing models based on metadata, according to some embodiments. FIG. 6 shows execution steps for executing processes based on metadata, according to a method 600. The method 600 may include execution steps 602, 604, 606, 608, 610, 612 and 614 performed in a risk modelling/analysis system (e.g., system 1000 in FIG. 1) including one or more processors (e.g., processor 210 in FIG. 2). It should be understood that the steps described herein are merely illustrative and additional or substitute steps should also be considered to be within the scope of this disclosure. Furthermore, methods with a fewer numbers of steps should also be considered to be within the scope of this disclosure.

At step 602, the one or more processors may receive a set of data containing relational database metadata (e.g., metadata 172 or 300), model data (e.g., framework/model/methodology data 178), and customer loan data (e.g., portfolio data 174).

At step 604, the one or more processors may configure a first model (e.g., EAD model) and a second model (e.g., LGD model) based on the model data and the metadata.

The one or more processors may configure one or more databases (e.g., database 170) in a plurality of logical tables (e.g., logical tables of "users", "scenarios", "portfolios", "amortization schedule", "framework", "methodologies", "model", "metric", "equation", "term", "transformation" and "self-dependencies"), each including at least one logical row and at least one logical column. The one or more processors may be further configured to store the set of data into the plurality of logical tables such that the metadata (e.g., metadata 300) includes entities (e.g., users 310, scenarios 314, portfolios 316, amortization schedule 317, framework 320, methodologies 330, model 340, metric 350, equation 360, term 370, transformation 380, and self-dependencies 390) and relationships (e.g., user-scenario 312, framework-methodology 322, framework-model 326, and equation-term 365) represented by the plurality of logical tables. In configuring the first model and the second model, the one or more processors may be configured to extract definitions of the first and second models from the entities and relationships (e.g., from model 340, metric 350, equation 360, term 370, transformation 380). At least one of the first and second models may represent at least one equation relating to a credit risk (e.g., $y=a*m(x)+b$). The plurality of logical tables may include at least one logical table representing the at least one equation (e.g., the "equation" table). The at least one equation may include at least one of transformation, coefficient, scale, or intercept. The plurality of logical tables may include at least one logical table representing the at least one of transformation (e.g., the "transformation" table), coefficient, scale (e.g., the "term" table), or intercept (e.g., the "equation" table) of the at least one equation. In some embodiments, the one or more processors may execute one or more models including one of fixed-rate amortization or adjustable-rate amortization.

At step 606, the one or more processors may partition, based on the relational database metadata, the customer loan data into first data (e.g., data for EAD model) and second data (e.g., data for LGD model). The one or more databases may store the customer loan data as data items in a first logical table (e.g., the "portfolios" table) including a plurality of logical rows and a plurality of logical columns. The first data may correspond to data items of the customer loan data in a first set of logical columns (e.g., columns for EAD model) among the plurality of logical columns. The second data may correspond to data items of the customer loan data in a second set of logical columns (e.g., columns for LGD model) that do not include any column of the first set of logical columns.

At step 608, the one or more processors may execute, by executing a first execution unit (e.g., execution unit 180-1), the first model using the first data of the customer loan data to output a first credit risk score (e.g., a result of EAD model). In executing the first model, the one or more processors may be configured to generate a first code based on the first model and execute the first code using the first data.

At step 610, the one or more processors may execute, by executing a second execution unit (e.g., execution unit 180-3) different from the first execution unit, the second model using the second data of the customer loan data to output a second credit risk score (e.g., a result of LGD model). In executing the second model, the one or more processors may be configured to generate a second code based on the second model and executing the second code using the second data.

The first execution unit and the second execution unit may be executed in parallel. The first execution unit and the second execution unit may be executed on different nodes in a cluster of computers (e.g., execution unit 180-1 and execution unit 180-3 can be executed in parallel on different nodes).

At step 612, the one or more processors may generate a third credit risk score (e.g., a result of ECL) based on the first credit risk score and the second credit risk score (e.g., by multiplying a result of EAD, a result of PD, and a result of LGD).

At step 614, the one or more processors may transmit a notification based on the third credit risk score. For example, the alert and analysis manager 155 may (1) compare a result of ECL (as a credit loss value) based on portfolio data of a particular user, with a threshold, and (2) determine whether the credit loss value is greater than the threshold. In response to determining that the credit loss value is greater than the threshold, the alert and analysis manager 155 may perform a notification process by transmitting a notification or an alert to the particular user.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by one or more processors, a set of data containing relational database metadata, model data, and customer loan data;
   configuring, by the one or more processors, a first model and a second model based on the model data and the metadata;
   partitioning, by the one or more processors based on the relational database metadata, the customer loan data into first data and second data;
   responsive to determining, by the one or more processors, an allocation of the first data to a first execution node of a plurality of execution nodes and the second data to a second execution node of the plurality of execution nodes, the allocation corresponding to a partition for each execution node in the plurality of execution nodes,
   executing, by the one or more processors executing the first execution node of the allocation, the first model using the first data of the customer loan data to output a first credit risk score;
executing, by the one or more processors executing the second execution node of the allocation in parallel with the first execution node thereby improving performance of processing of the first data and the second data, the second model using the second data of the customer loan data to output a second credit risk score;
generating, by the one or more processors, a third credit risk score based on the first credit risk score and the second credit risk score; and
transmitting, by the one or more processors, a notification based on the third credit risk score.

2. The method according to claim 1, wherein at least one of the first model or the second model represents at least one equation relating to a credit risk.

3. The method according to claim 1, further comprising: executing one or more models including one of fixed-rate amortization or adjustable-rate amortization.

4. The method according to claim 1, wherein
executing the first model comprises generating a first code based on the first model and executing the first code using the first data, and
executing the second model comprises generating a second code based on the second model and executing the second code using the second data.

5. The method according to claim 1, further comprising:
configuring one or more databases in a plurality of logical tables, each comprising at least one logical row and at least one logical column; and
storing the set of data into the plurality of logical tables such that the metadata includes entities and relationships represented by the plurality of logical tables,
wherein the configuring the first model and the second model comprises extracting definitions of the first and second models from the entities and relationships.

6. The method according to claim 5, wherein
at least one of the first model or the second model represents at least one equation relating to a credit risk, and
the plurality of logical tables include at least one logical table representing the at least one equation.

7. The method according to claim 6, wherein
the at least one equation comprises at least one of transformation, coefficient, scale, or intercept, and
the plurality of logical tables include at least one logical table representing the at least one of transformation, coefficient, scale, or intercept of the at least one equation.

8. The method according to claim 5, wherein
the one or more databases store the customer loan data as data items in a first logical table including a plurality of logical rows and a plurality of logical columns,
the first data correspond to data items of the customer loan data in a first set of logical columns among the plurality of logical columns, and
the second data correspond to data items of the customer loan data in a second set of logical columns which do not include any column of the first set of logical columns.

9. The method according to claim 1, wherein the first execution node and the second execution node are different nodes in a cluster of computers.

10. A system comprising one or more processors configured to:
receive a set of data containing relational database metadata, model data, and customer loan data;
partition, based on the relational database metadata, the customer loan data into first data and second data;
configure a first model and a second model based on the model data and the metadata;
responsive to determining, by the one or more processors, an allocation of the first data to a first execution node of a plurality of execution nodes and the second data to a second execution node of the plurality of execution nodes, the allocation corresponding to a partition for each execution node in the plurality of execution nodes,
execute, by executing the first execution node of the allocation, the first model using the first data of the customer loan data to output a first credit risk score;
execute, by executing the second execution node of the allocation in parallel with the first execution node thereby improving performance of processing of the first data and the second data, the second model using the second data of the customer loan data to output a second credit risk score;
generate a third credit risk score based on the first credit risk score and the second credit risk score; and
transmit a notification based on the third credit risk score.

11. The system according to claim 10, wherein at least one of the first model or the second model represents at least one equation relating to a credit risk.

12. The system according to claim 10, wherein the one or more processors are configured to execute one or more models including one of fixed-rate amortization or adjustable-rate amortization.

13. The system according to claim 10, wherein
in executing the first model, the one or more processors are configured to generate a first code based on the first model and execute the first code using the first data, and
in executing the second model, the one or more processors are configured to generate a second code based on the second model and executing the second code using the second data.

14. The system according to claim 10, wherein the one or more processors are further configured to:
configure one or more databases in a plurality of logical tables, each comprising at least one logical row and at least one logical column; and
store the set of data into the plurality of logical tables such that the metadata includes entities and relationships represented by the plurality of logical tables,
wherein in configuring the first model and the second model, the one or more processors are configured to extract definitions of the first and second models from the entities and relationships.

15. The system according to claim 14, wherein
at least one of the first model or the second model represents at least one equation relating to a credit risk, and
the plurality of logical tables include at least one logical table representing the at least one equation.

16. The system according to claim 15, wherein
the at least one equation comprises at least one of transformation, coefficient, scale, or intercept, and
the plurality of logical tables include at least one logical table representing the at least one of transformation, coefficient, scale, or intercept of the at least one equation.

17. The system according to claim 14, wherein the one or more databases store the customer loan data as data items in a first logical table including a plurality of logical rows and a plurality of logical columns, the first data correspond to data items of the customer loan data in a first set of logical columns among the plurality of logical columns, and the second data correspond to data items of the customer loan data in a second set of logical columns which do not include any column of the first set of logical columns.

18. The system according to claim 10, wherein the first execution node and the second execution node are different nodes in a cluster of computers.

* * * * *